United States Patent
Fukuyama et al.

(10) Patent No.: US 9,893,370 B2
(45) Date of Patent: Feb. 13, 2018

(54) SINGLE FUEL CELL, FUEL CELL STACK, AND METHOD OF MANUFACTURING FUEL CELL STACK

(71) Applicant: NISSAN MOTOR CO., LTD., Yokohama-shi, Kanagawa (JP)

(72) Inventors: Yosuke Fukuyama, Yokohama (JP); Keita Iritsuki, Yokohama (JP); Motoki Yaginuma, Yokohama (JP); Takeshi Shiomi, Yokohama (JP); Hiroshi Miyaoka, Tokyo (JP); Kenji Kanamori, Yokohama (JP); Kazuyuki Sato, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 499 days.

(21) Appl. No.: 14/384,849

(22) PCT Filed: Mar. 12, 2013

(86) PCT No.: PCT/JP2013/057576
§ 371 (c)(1),
(2) Date: Sep. 12, 2014

(87) PCT Pub. No.: WO2013/137470
PCT Pub. Date: Sep. 19, 2013

(65) Prior Publication Data
US 2015/0037706 A1    Feb. 5, 2015

(30) Foreign Application Priority Data

Mar. 15, 2012  (JP) .................................. 2012-058162
Mar. 29, 2012  (JP) .................................. 2012-076906
Dec. 6, 2012   (JP) .................................. 2012-267164

(51) Int. Cl.
*H01M 8/04007*   (2016.01)
*H01M 8/0258*    (2016.01)
(Continued)

(52) U.S. Cl.
CPC ......... *H01M 8/04074* (2013.01); *H01M 8/02* (2013.01); *H01M 8/0254* (2013.01);
(Continued)

(58) Field of Classification Search
CPC ........... H01M 8/04074; H01M 8/0258; H01M 8/2483; H01M 8/2465; H01M 8/2457;
(Continued)

(56) References Cited

U.S. PATENT DOCUMENTS 6,872,483 B2   3/2005   Sugiura et al.
2002/0187386 A1  12/2002  Sugiura et al.
(Continued)

FOREIGN PATENT DOCUMENTS

GB   2 336 937 A    11/1999
JP   2-129857 A     5/1990
(Continued)

*Primary Examiner* — Jane Rhee
(74) *Attorney, Agent, or Firm* — Foley & Lardner LLP

(57) ABSTRACT

A single fuel cell, a plurality of which are to be stacked to form a fuel cell stack, includes a membrane electrode assembly having a structure including paired electrode layers and an electrolyte membrane held between the paired electrode layers, paired separators each forming a gas passage between the separator and the membrane electrode assembly, and a displacement absorber having a conductive property and interposed between one separator of the single fuel cell and an adjacent-side separator of another single fuel cell to be stacked adjacent to the single fuel cell. The displacement absorber is connected to at least any one of the separators.

15 Claims, 17 Drawing Sheets

(51) Int. Cl.
| | |
|---|---|
| *H01M 8/2483* | (2016.01) |
| *H01M 8/2465* | (2016.01) |
| *H01M 8/2457* | (2016.01) |
| *H01M 8/247* | (2016.01) |
| *H01M 8/0254* | (2016.01) |
| *H01M 8/0267* | (2016.01) |
| *H01M 8/0297* | (2016.01) |
| *H01M 8/02* | (2016.01) |
| *H01M 8/1018* | (2016.01) |
| *H01M 8/0206* | (2016.01) |

(52) U.S. Cl.
CPC ....... *H01M 8/0258* (2013.01); *H01M 8/0267* (2013.01); *H01M 8/0297* (2013.01); *H01M 8/247* (2013.01); *H01M 8/2457* (2016.02); *H01M 8/2465* (2013.01); *H01M 8/2483* (2016.02); *H01M 8/0206* (2013.01); *H01M 2008/1095* (2013.01); *H01M 2300/0082* (2013.01); *Y02P 70/56* (2015.11)

(58) Field of Classification Search
CPC .. H01M 8/247; H01M 8/0254; H01M 8/0267; H01M 8/0206; H01M 8/0297; H01M 8/02; H01M 2008/1095; H01M 2300/0082
See application file for complete search history.

(56) References Cited

U.S. PATENT DOCUMENTS

| | | |
|---|---|---|
| 2005/0106444 A1 | 5/2005 | Yamauchi et al. |
| 2005/0164077 A1 | 7/2005 | Bacon |
| 2009/0136805 A1 | 5/2009 | Sato et al. |

FOREIGN PATENT DOCUMENTS

| | | |
|---|---|---|
| JP | 2002-298902 A | 10/2002 |
| JP | 2002-367665 A | 12/2002 |
| JP | 2003-151571 A | 5/2003 |
| JP | 2006-318863 A | 11/2006 |
| JP | 2009-009731 A | 1/2009 |
| JP | 2009-266533 A | 11/2009 |
| JP | 4432518 B2 | 3/2010 |

[FIG.1]
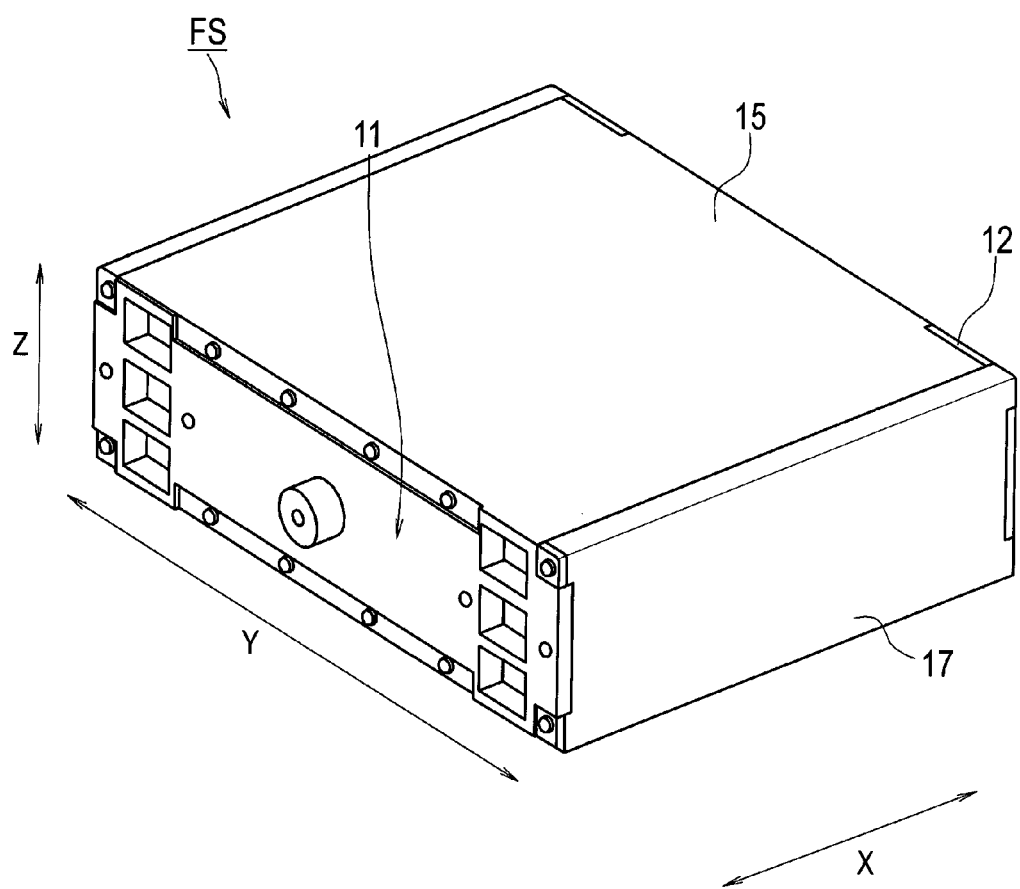

[FIG.2]
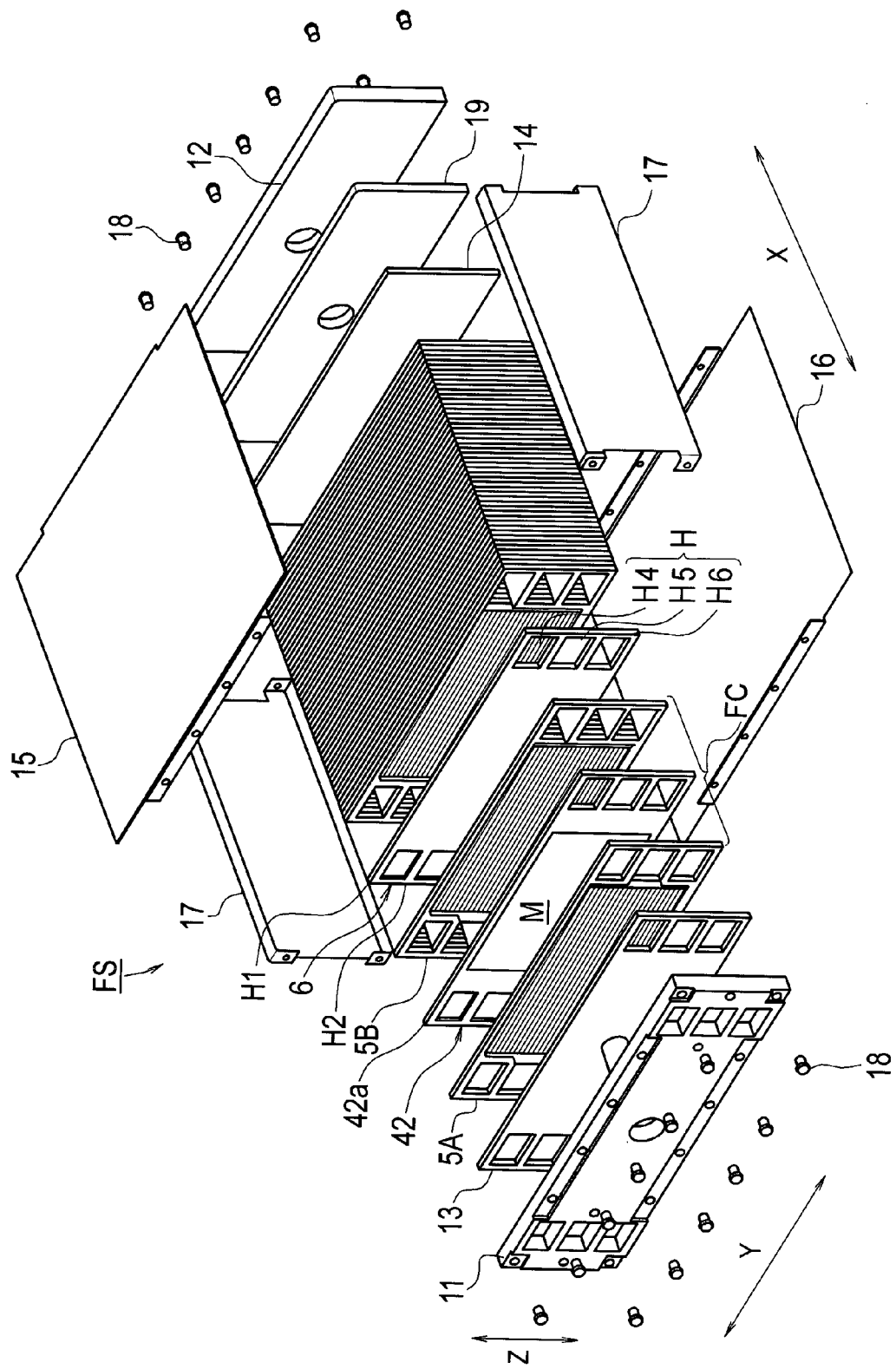

[FIG.3]
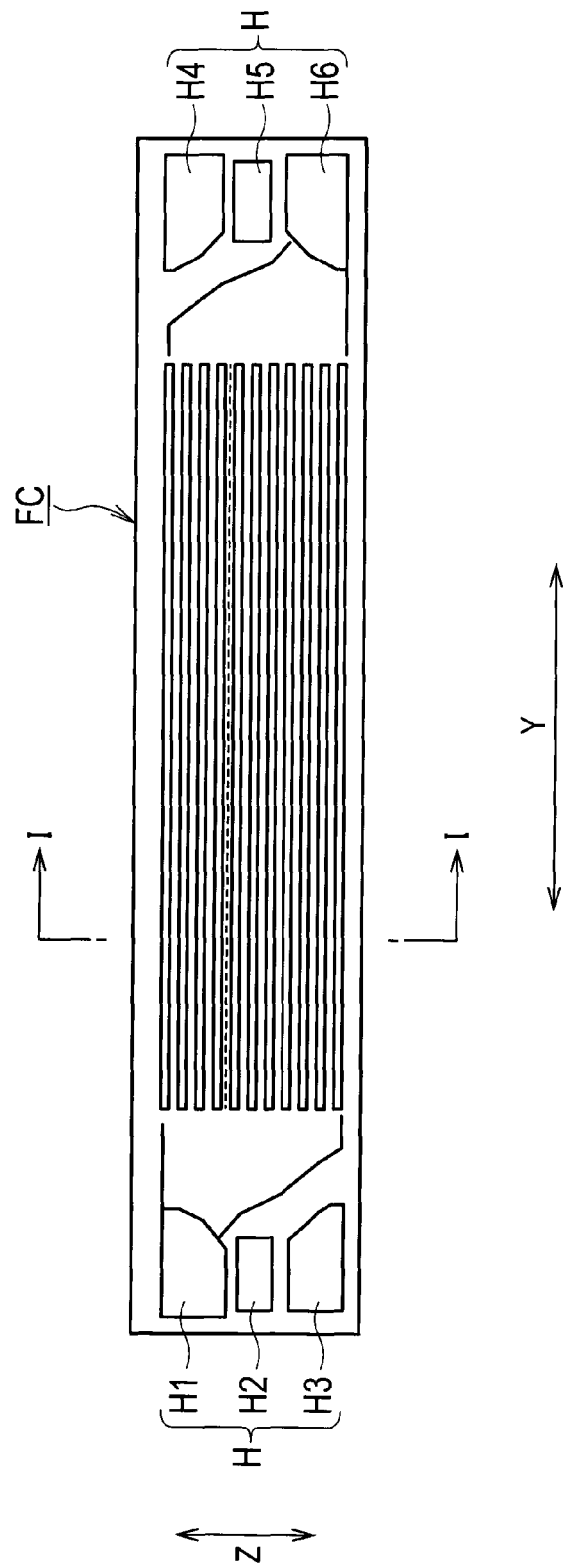

[FIG.4A]
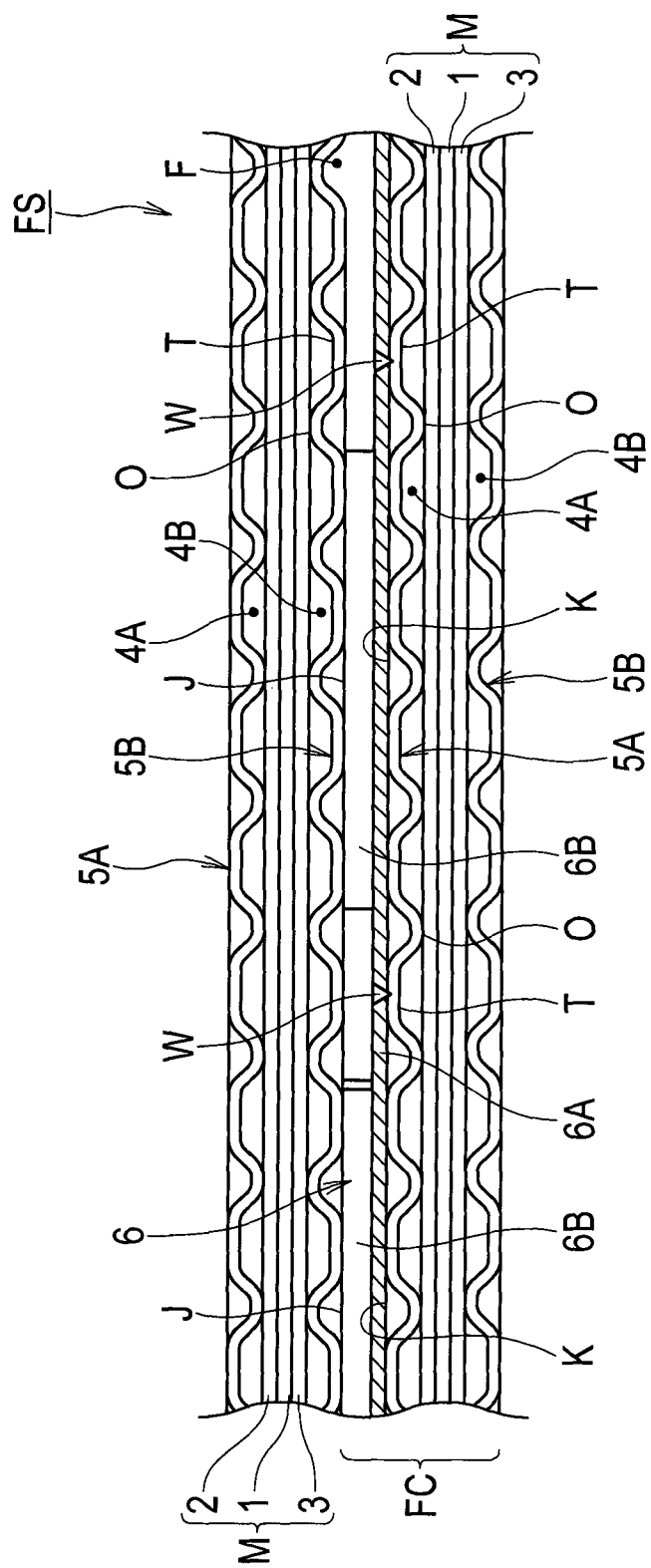

[FIG.4B]
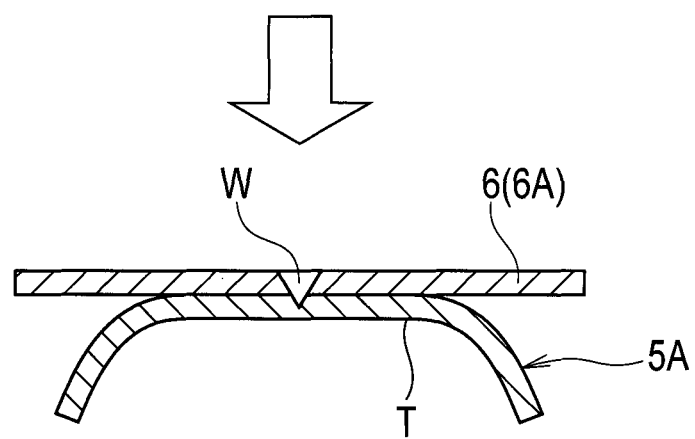
[FIG.4C]
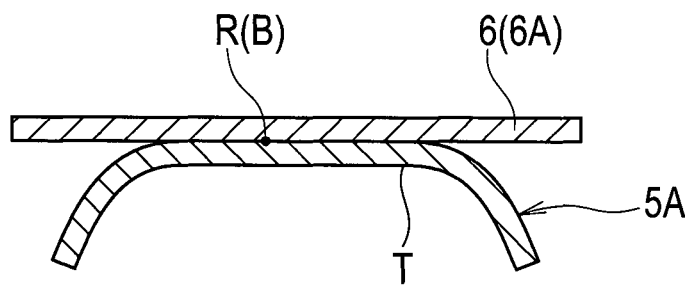

[FIG.5]
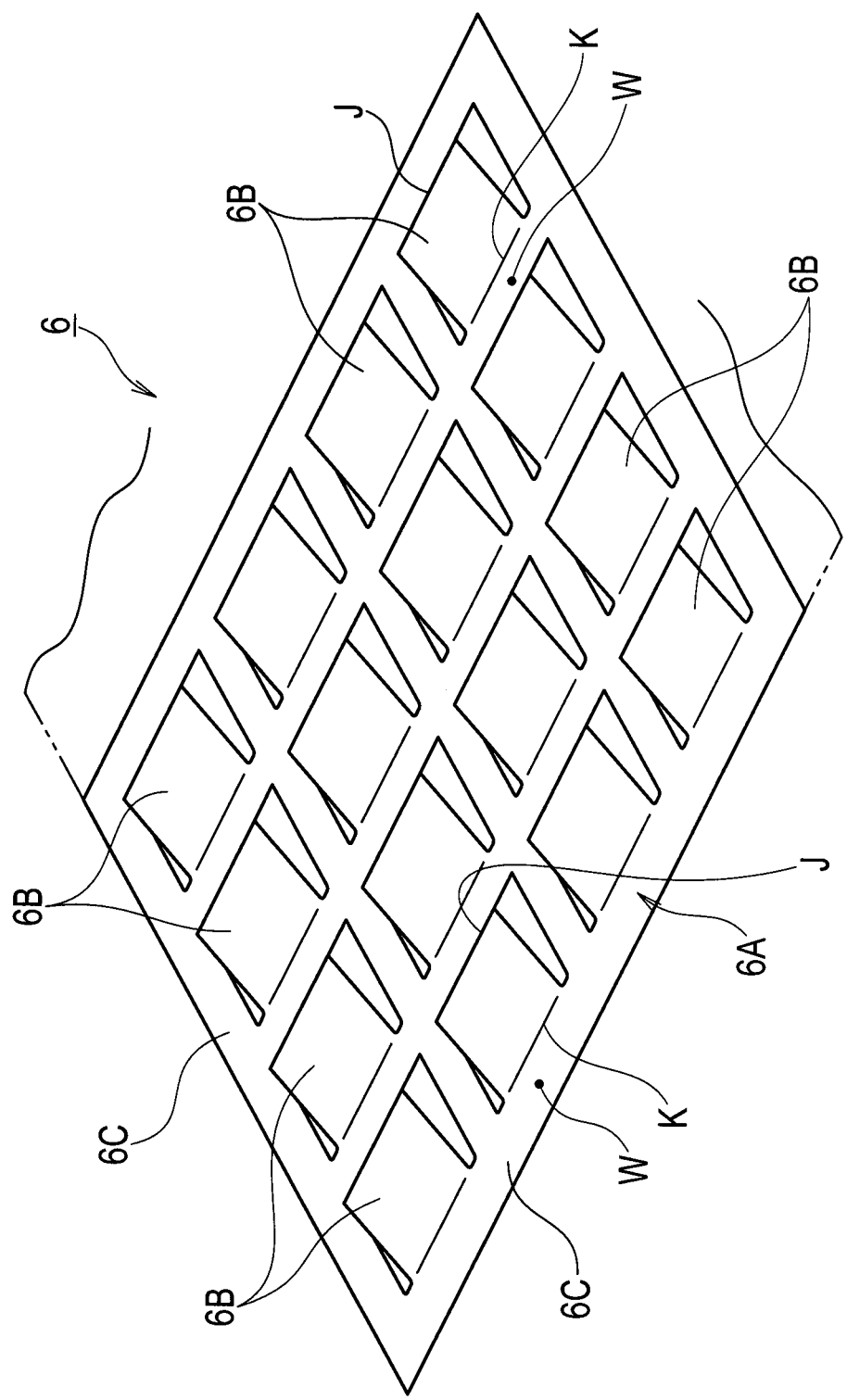

[FIG.6A]
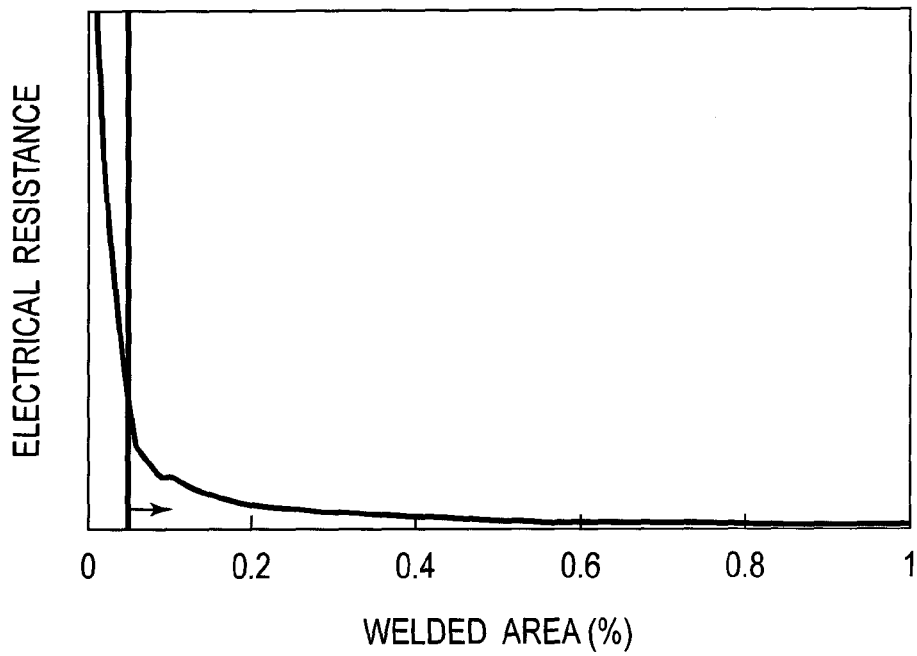
[FIG.6B]
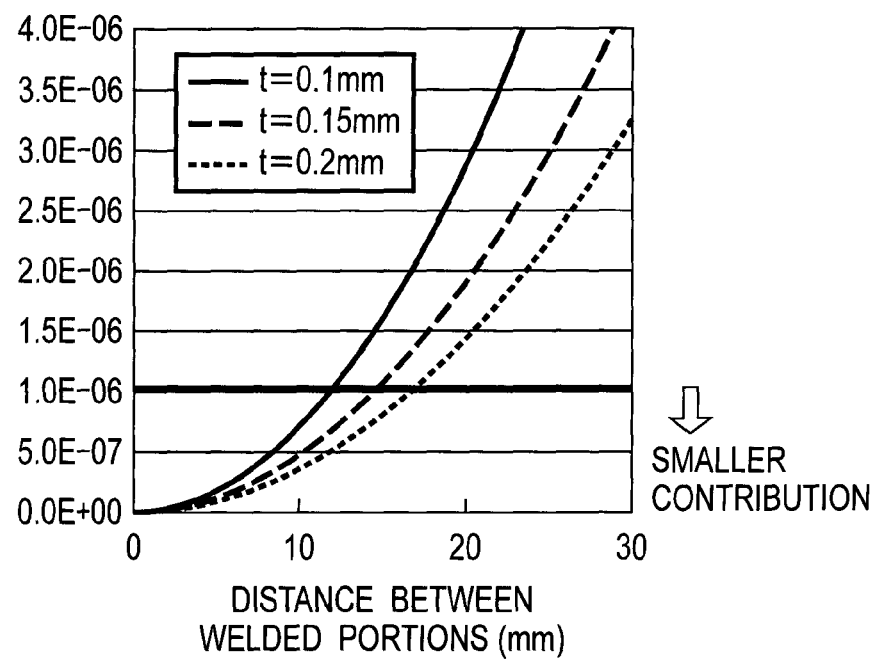

[FIG.7]
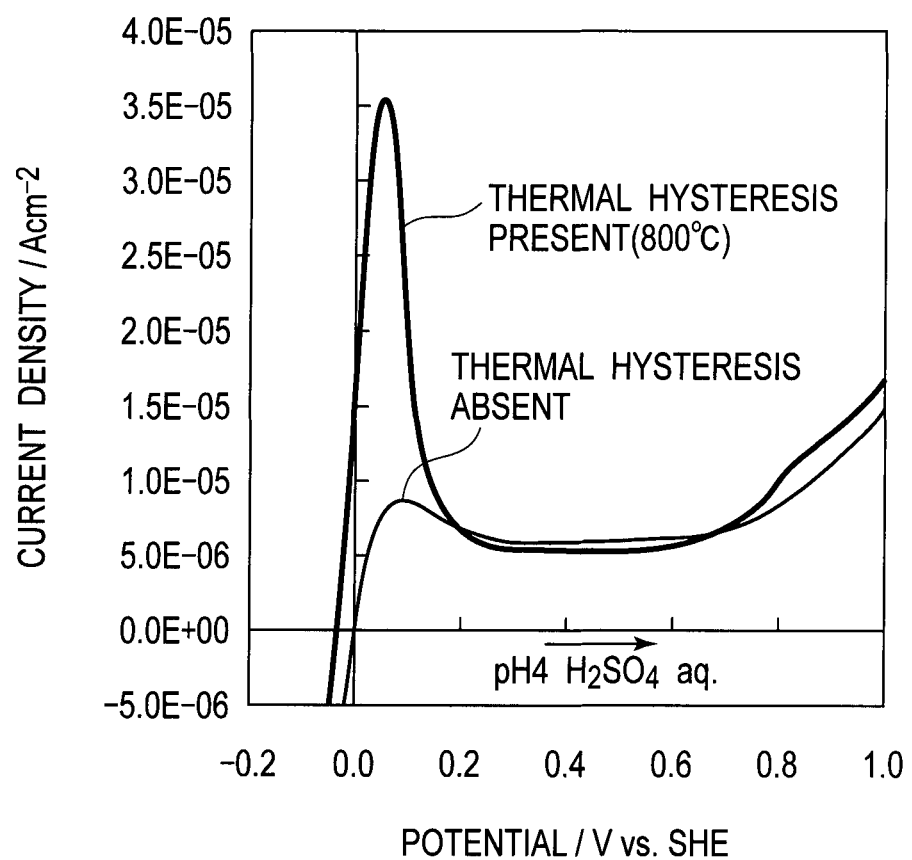

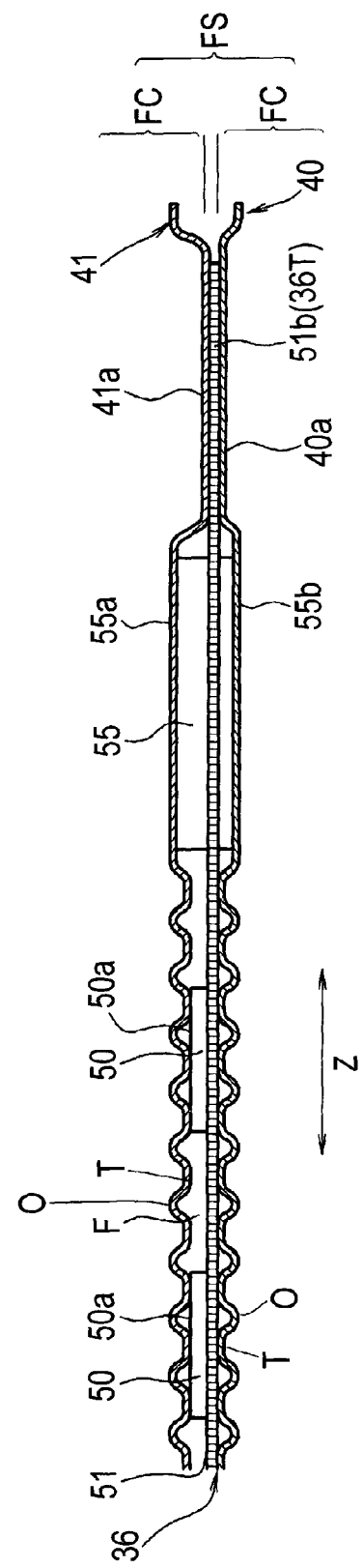
[FIG.8A]

[FIG.8B]
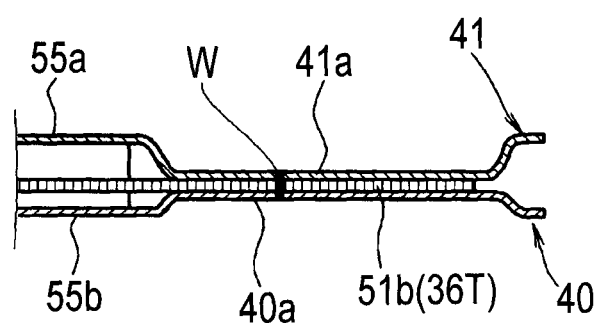

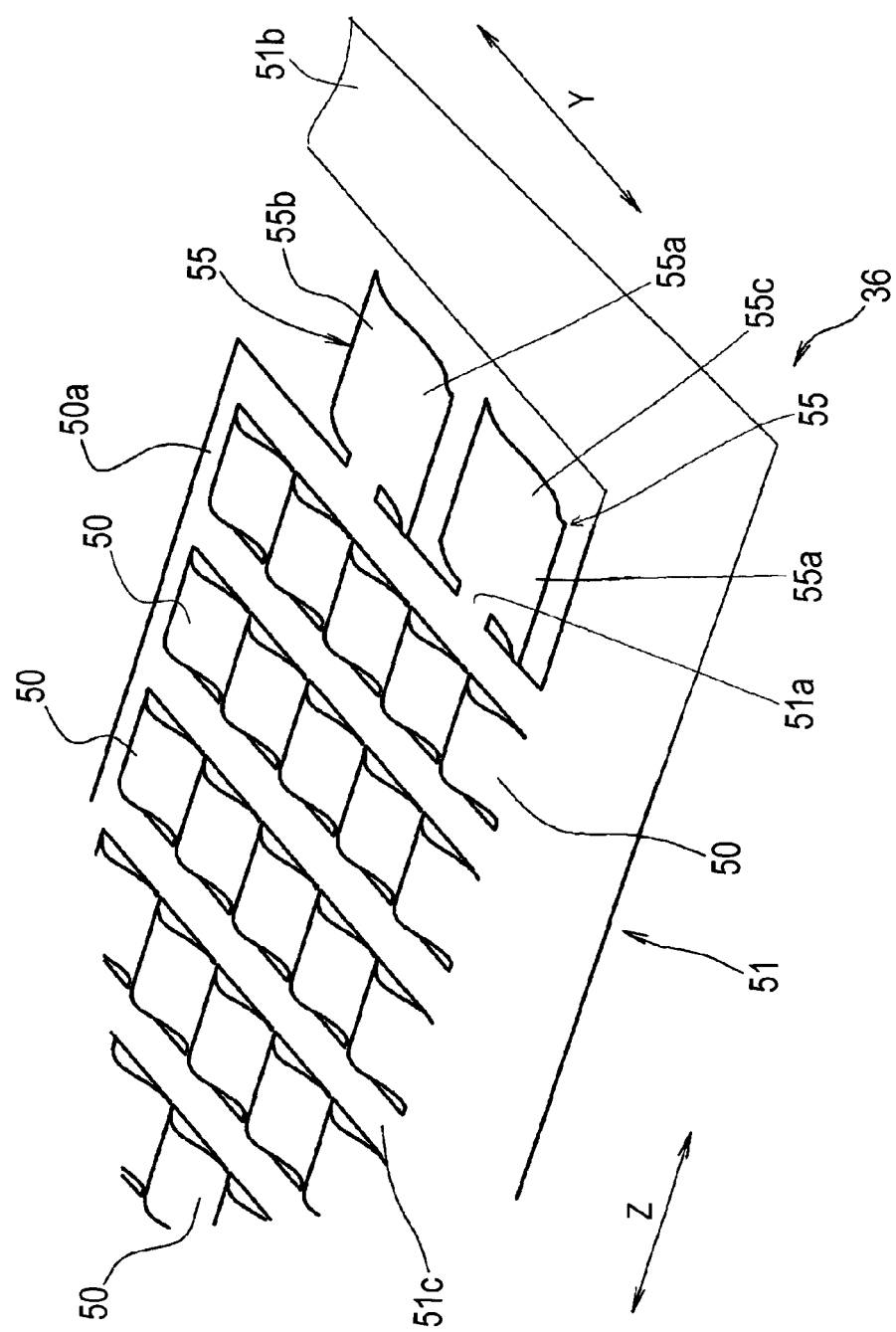
[FIG.9]

[FIG.10A]
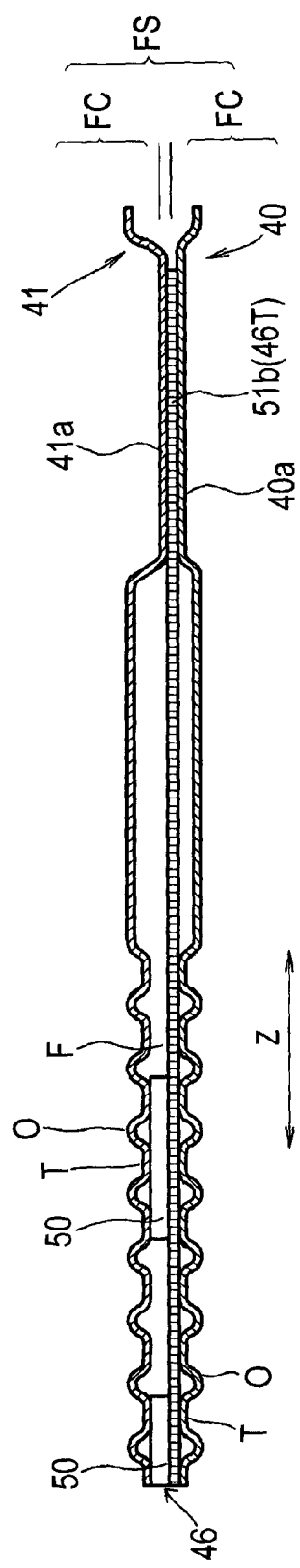

[FIG.10B]
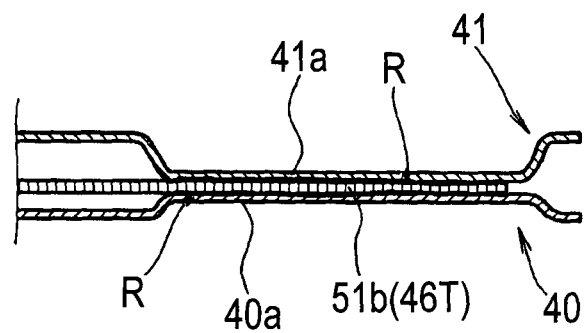

[FIG.11]
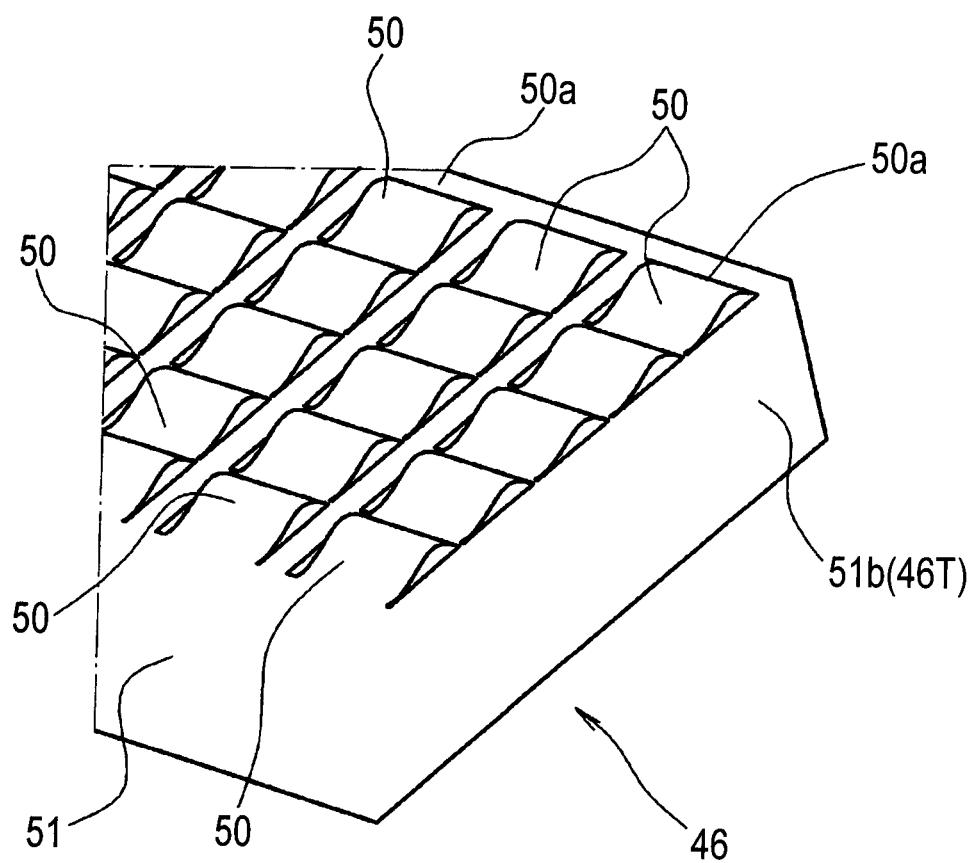

[FIG.12A]
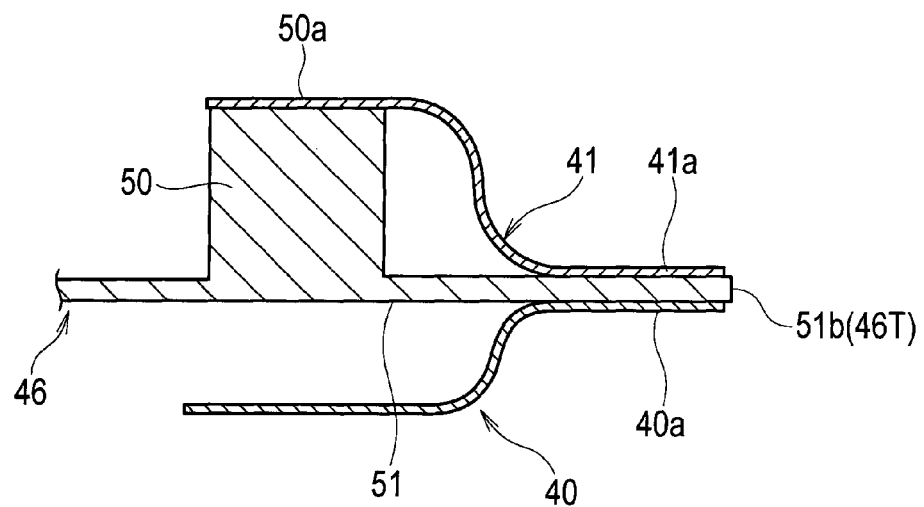
[FIG.12B]
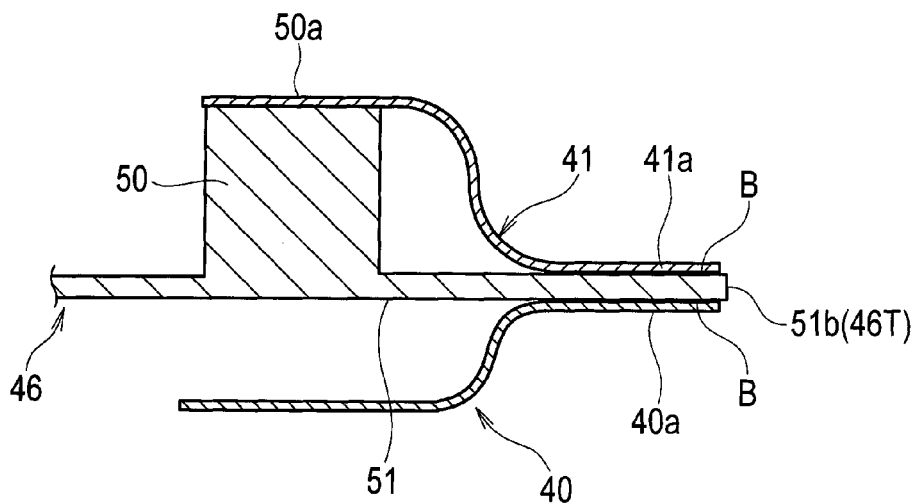

[FIG.13]
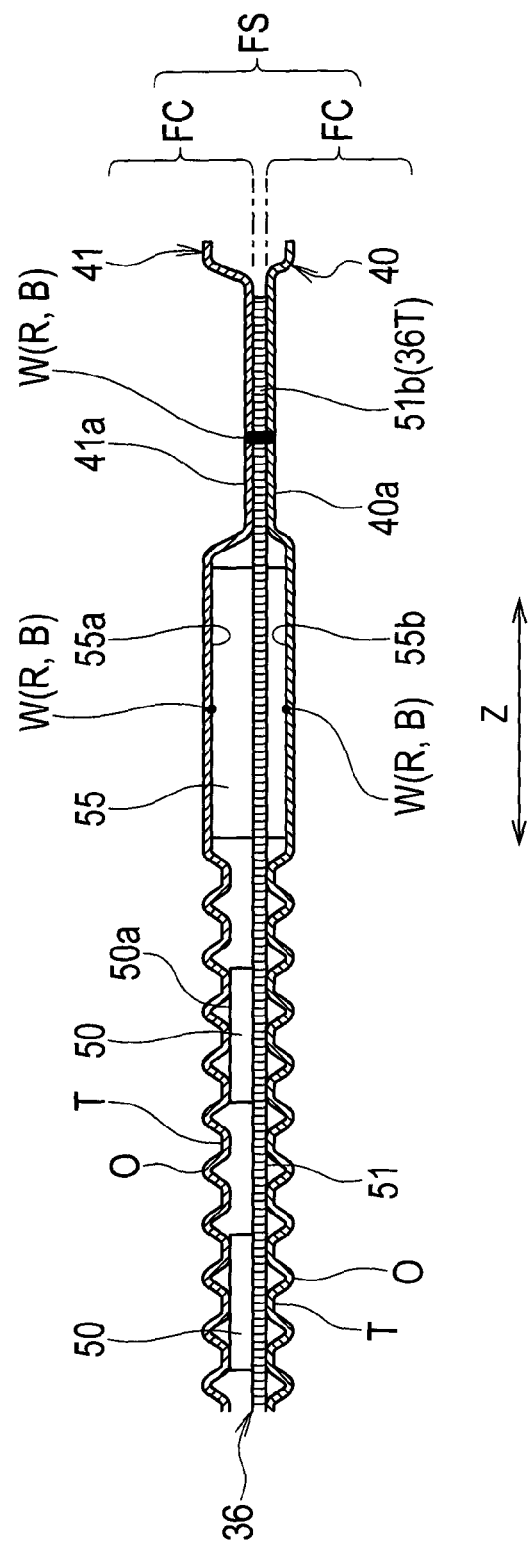

[FIG.14A]
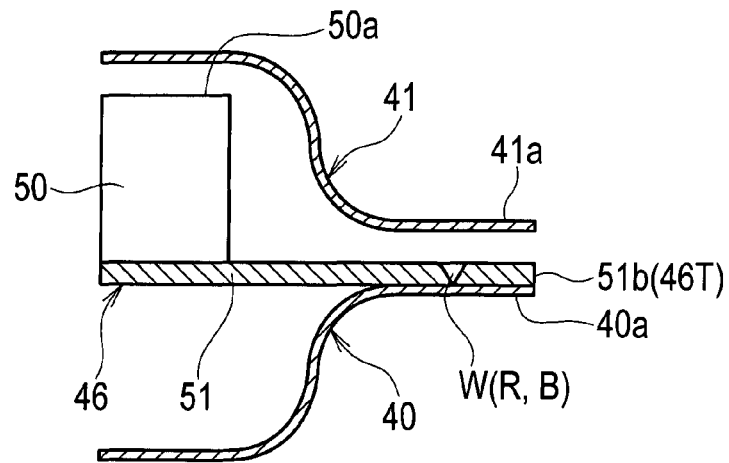
[FIG.14B]
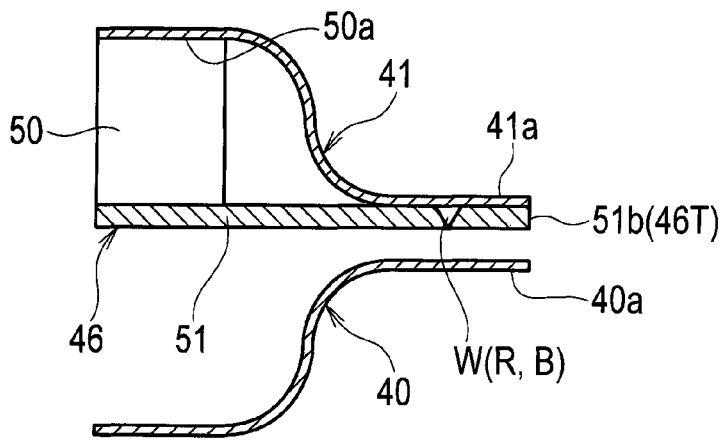
[FIG.14C]
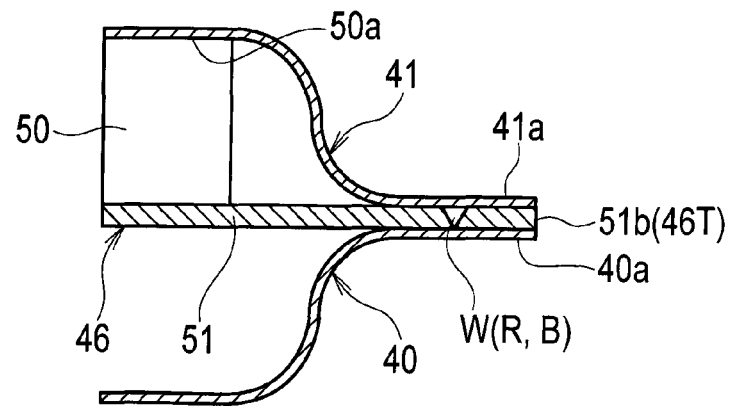

SINGLE FUEL CELL, FUEL CELL STACK, AND METHOD OF MANUFACTURING FUEL CELL STACK

TECHNICAL FIELD

The present invention relates to a single fuel cell such as a polymer electrolyte fuel cell (PEFC), a fuel cell stack formed by stacking the single fuel cells, and a method of manufacturing the fuel cell stack.

BACKGROUND ART

One type of single fuel cell is described in Patent Literature 1. The single fuel cell described in Patent Literature 1 includes a hydrogen electrode and an oxygen electrode respectively on both sides of a MEA (membrane electrode assembly) and also includes a plate separator forming a hydrogen passage between the separator and the hydrogen electrode and another plate separator forming an oxygen passage between the separator and the oxygen electrode. Moreover, the single fuel cell includes a coolant passage portion on the oxygen electrode side.

The coolant passage portion includes two plate separators and a pre-load plate interposed between the two plate separators, and a space between the two plate separators is used as a passage of cooling water. The pre-load plate has a wave-shaped cross section and distributes a load locally generated due to form errors in constituent parts of the single fuel cell. The load is thereby evenly applied to the constituent parts.

CITATION LIST

Patent Literature

[PTL 1] Japanese Patent No. 4432518

SUMMARY OF INVENTION

When this type of single fuel cell is used as a power source of a vehicle such as an automobile, multiple single fuel cells are stacked to form a fuel cell stack. In such a fuel cell stack, it is necessary to form a cooling fluid passage between the single fuel cells adjacent to each other and also to electrically connect the single fuel cells to each other. In this case, the contact resistance of connection portions greatly affects the power generation performance.

In the single fuel cell described above, the pre-load plate existing in the cooling fluid passage (coolant passage portion) can be used as a connector. However, each of the separators and the pre-load plate having the wave-shaped cross section are only in line contact with each other and no measures are taken to reduce the electrical contact resistance.

An object of the present invention is to provide a single fuel cell, a plurality of which are to be stacked to form a fuel cell stack, a fuel cell stack, and a method of manufacturing the fuel cell stack, in which the electrical contact resistance of a connection portion of the single fuel cell with another single fuel cell stacked adjacent is reduced.

A single fuel cell, a plurality of which are to be stacked to form a fuel cell stack, in accordance with some embodiments includes a membrane electrode assembly having a structure including paired electrode layers and an electrolyte membrane held between the paired electrode layers, paired separators each forming a gas passage between the separator and the membrane electrode assembly, and a displacement absorber having a conductive property and interposed between one separator of the single fuel cell and an adjacent-side separator of another single fuel cell to be stacked adjacent to the single fuel cell. The displacement absorber is connected to at least any one of the separators.

A fuel cell stack formed by stacking a plurality of the single fuel cells includes a cooling fluid passage between respective two of the single fuel cells stacked adjacent to each other with the displacement absorber between the respective two of the single fuel cells.

A method of manufacturing a fuel cell stack formed by stacking a plurality of single fuel cells each including a membrane electrode assembly having a structure including paired electrode layers and an electrolyte membrane held between the paired electrode layers, paired separators each forming a gas passage between the separator and the membrane electrode assembly, and a displacement absorber having a conductive property and disposed on one separator out of the paired separators, in accordance with some embodiments includes, for each of the single fuel cells, joining the displacement absorber and at least one of the separators of the respective single fuel cells adjacent to each other in at least part of contact portions of the displacement absorber and the at least one of the separators, after the joining operation, arranging the separators and the displacement absorbers of the single fuel cells alternately to stack the single fuel cells in a stacked direction, and applying a load to the stacked single fuel cells in the stacked direction to restrain the stacked single fuel cells.

BRIEF DESCRIPTION OF DRAWINGS

FIG. 1 is a perspective view of an exterior of a fuel cell stack in an embodiment of the present invention.

FIG. 2 is a perspective view of the fuel cell stack of in FIG. 1 shown in an exploded state.

FIG. 3 is a plan view of a single fuel cell shown in FIG. 1.

FIG. 4A is a cross-sectional view for explaining the single fuel cell and the fuel cell stack in the embodiment of the present invention.

FIG. 4B is an enlarged cross-sectional view of a welded portion which is used to explain the single fuel cell and the fuel cell stack in the embodiment of the present invention.

FIG. 4C is an enlarged cross-sectional view which shows another example and which is used to explain the single fuel cell and the fuel cell stack in the embodiment of the present invention.

FIG. 5 is a perspective view showing part of a displacement absorber shown in FIGS. 4A to 4C.

FIG. 6A is a graph showing a relationship between the total area of the welded portions and the electrical resistance.

FIG. 6B is a graph showing a relationship between the distance between the welded portions and the characteristics of the displacement absorbers.

FIG. 7 is a graph showing a relationship between the current density and the potential in presence of thermal hysteresis and the relationship in absence thereof.

FIG. 8A is a view for explaining a fuel cell stack in a second embodiment of the present invention and is an enlarged cross-sectional view of a portion along the I-I line shown in FIG. 3.

FIG. 8B is a view for explaining the fuel cell stack in the second embodiment of the present invention and is a cross-sectional view of a main portion which shows another example.

FIG. 9 is a partial perspective view of a displacement absorber shown in FIGS. 8A and 8B.

FIG. 10A is a view for explaining a fuel cell stack in a third embodiment of the present invention and is an enlarged cross-sectional view of a portion corresponding to the I-I line shown in FIG. 3.

FIG. 10B is a view for explaining the fuel cell stack in the third embodiment of the present invention and is a cross-sectional view of a main portion which shows another example.

FIG. 11 is a perspective view of part of a displacement absorber shown in FIGS. 10A, 10B.

FIG. 12A is a view for explaining a fuel cell stack in a fourth embodiment of the present invention and is a cross-sectional view schematically showing separators and an end portion of a displacement absorber.

FIG. 12B is a view for explaining the fuel cell stack in the fourth embodiment of the present invention and is a cross-sectional view showing another example.

FIG. 13 is a cross-sectional view for explaining a fuel cell stack in a fifth embodiment of the present invention.

FIG. 14A is a cross-sectional view of a main portion which shows an example of a fuel cell stack in a sixth embodiment of the present invention.

FIG. 14B is a cross-sectional view of a main portion which shows an example of a fuel cell stack in a sixth embodiment of the present invention.

FIG. 14C is a cross-sectional view of a main portion which shows an example of a fuel cell stack in a sixth embodiment of the present invention.

DESCRIPTION OF EMBODIMENTS

First Embodiment

An embodiment of a single fuel cell and a fuel cell stack of the present invention is described below based on the drawings. The single fuel cell and the fuel cell stack in the embodiment are a polymer electrolyte single fuel cell and a polymer electrolyte fuel cell stack which are configured to be mounted on an electric car and the like.

A fuel cell stack FS shown in FIGS. 1 and 2 has a case integrated configuration in which current collectors 13, 14, multiple single fuel cells FC, and multiple displacement absorbers 6 are stacked between paired end plates 11, 12 and fastened together by using fastening plates 15, 16 and reinforcement plates 17, 17 in such a way that the single fuel cells FC are pressed against each other by the end plates 11, 12. Note that, in the drawings, reference numeral 18 denotes bolts and reference numeral 19 denotes a spacer.

In each of the single fuel cells FC in the drawings, paired separators 5A, 5B are disposed in such a way that gas passages for power generation gases to flow are defined and formed respectively on both surface sides of a cell frame 42. The power generation gases are a hydrogen-containing gas and an oxygen-containing gas.

The cell frame 42 is made of resin. In the embodiment, the cell frame 42 has a horizontal rectangle shape in a front view which is a view in a stacked direction X of the single fuel cells FC, and is provided with a membrane electrode assembly M in a center portion of a substrate 42a formed to have a substantially uniform thickness. The cell frame 42 can be changed to have a square or vertical rectangle shape in the front view.

As shown in FIG. 3, manifold portions H for supplying and discharging the hydrogen-containing gas and the oxygen-containing gas are formed respectively in shorter edge sides of each single fuel cell FC. The manifold portion H on one side which is the left side in FIG. 3 includes manifold holes H1 to H3. The manifold holes H1 to H3 are for supplying the oxygen-containing gas (H1), supplying cooling fluid (H2), and supplying the hydrogen-containing gas (H3) and each form a passage extending in the stacked direction X shown in FIG. 2.

The manifold portion H on the other side in FIG. 3 includes manifold holes H4 to H6. The manifold holes H4 to H6 are for discharging the hydrogen-containing gas (H4), discharging cooling fluid (H5), and discharging the oxygen-containing gas (H6) and each form a passage extending in the stacked direction X shown in FIG. 2. The positional relationship of the holes for supplying and the holes for discharging may be partially or entirely opposite.

As also shown in FIG. 4A, each single fuel cell FC includes: the membrane electrode assembly M having a structure in which an electrolyte membrane 1 is held between paired electrode layers (2, 3); and the paired separators 5A, 5B forming gas passages 4A, 4B between the separators 5A, 5B and the membrane electrode assembly M. In the embodiment, since the membrane electrode assembly M is disposed in the center portion of the cell frame 42 shown in FIG. 2 as described above, the separators 5A, 5B form the gas passages 4A, 4B between the separators 5A, 5B and the cell frame 42 and also between the separators 5A, 5B and the membrane electrode assembly M.

Moreover, each single fuel cell FC includes the displacement absorber 6 which is conductive and which is interposed between one separator 5A and another single fuel cell FC located adjacent when stacked, and has such a structure that the displacement absorber 6 is connected to at least the one separator 5A. In the embodiment, the one separator 5A and the displacement absorber 6 are connected to each other by welding (welded portions W in FIGS. 4A and 4B).

The membrane electrode assembly M is generally referred to as MEA. The membrane electrode assembly M includes: the anode layer 2 which is one electrode layer and which is provided on a surface of the electrolyte membrane 1 on one side (upper side in FIG. 4A); and the cathode layer 3 which is the other electrode layer and which is provided on a surface of the electrolyte membrane 1 on the other side, the electrolyte membrane 1 formed of a solid polymer membrane. Although omitted in the drawings, the anode layer 2 and the cathode layer 3 each have a structure in which a catalyst layer and an appropriate number of gas diffusion layers are stacked one on top of another.

Both of the separators 5A, 5B are made of, for example, stainless steel and have wave-shaped cross sections (have a concavo-convex shape or have a shape with protrusions and recesses in cross section) in the illustrated example. The one separator 5A forms the gas passages 4A for an anode gas (hydrogen-containing gas) between the one separator 5A and the anode layer 2 by using recessed portions O of the wave shape. The other separator 5B similarly forms the gas passages 4B for a cathode gas (oxygen-containing gas: air) between the other separator 5B and the cathode layer 3 by using the recessed portions O of the wave shape.

The membrane electrode assembly M and both of the separators 5A, 5B are subjected to sealing in peripheral portions thereof to be hermetically joined together and thereby form the single fuel cell FC. Moreover, in the fuel cell stack FS in which the multiple single fuel cells FC are stacked, the separators 5A, 5B of the single fuel cells FC adjacent to each other are hermetically joined together and a cooling fluid passage F is formed between the single fuel cells FC adjacent to each other. In the fuel cell stack FS, the displacement absorber 6 connected to the one separator 5A as described above exists in the cooling fluid passage F.

The displacement absorber 6 is formed by using a thin metal plate as a raw material and is conductive. As partially shown in FIG. 5, the displacement absorber 6 has a structure in which multiple spring function portions 6B are arranged on one surface of a base plate 6A in a matrix. Each of the spring function portions 6B of the displacement absorber 6 has a tongue shape to have a cantilever structure and is formed to be cut out and bent upward from the base plate 6A with the base-plate side being a fixed end K and a distal end side being a free end J. The displacement absorber 6 described above can be manufactured from a single sheet of material. In the displacement absorber 6 of the illustrated example, the directions of all of the spring function portions 6B are the same. However, the shape, direction, pitch, and the like of each spring function portion 6B may be changed.

The displacement absorber 6 is connected to the separator 5A disposed on the anode side of the electrode layers 2, 3 by welding (welded portions W) as shown in FIGS. 4A and 4B. In this case, in the displacement absorber 6, the base plate 6A is connected to protruding portions T of the wave shape in a cell-outer-side surface of the separator 5A has the shape with protrusions and recesses in cross section (wave-shaped cross section). Moreover, as shown in FIG. 4B, the displacement absorber 6 is welded (welded portion W) from the displacement absorber 6 side toward the separator 5A. The downward arrow shown in FIG. 4B indicates the welding direction.

Moreover, as shown in FIG. 5, in the displacement absorber 6, the base plate 6A has an outer edge portion 6C which does not overlap a reaction region of the membrane electrode assembly M. The displacement absorber 6 is configured such that at least the outer edge portion 6C is connected (welded) to the separator 5A. In addition to this, a portion between the adjacent spring function portions 6B is connected (welded) to the separator 5A. In the displacement absorber 6 described above, the free ends J of the spring function portions 6B come into contact with the cathode-side separator 5B of the other single fuel cell FC located adjacent when stacked, in the fuel cell stack FS.

Non-pressure welding methods typified by arc welding, electron beam welding, plasma welding, and laser welding can be employed as the one-direction welding performed from the displacement absorber 6 side toward the separator 5A. Moreover, the total area of the welded portions W in the displacement absorber 6 is preferably 0.05% or larger. When the total area is smaller than 0.05%, the electrical resistance drastically increases as shown in FIG. 6A and a power generation performance is greatly affected.

Moreover, the distance L(m) between the welded portions W preferably satisfies $L2/\delta t \leq 10-6$, provided that the electron conductivity of the displacement absorber 6 is $\delta$(S/m) and the thickness thereof is t(m). This is set in consideration of the contribution to the performance which is shown in FIG. 6B. When the electron conductivity of the displacement absorber 6, the thickness thereof, and the distance between the welded portions W are not uniform, the average values thereof are used.

The fuel cell stack FS formed by stacking the single fuel cells FC can be manufactured by the following method. Specifically, upon manufacturing the fuel cell stack FS formed by stacking the multiple single fuel cells FC each including: the membrane electrode assembly M; the paired separators 5A, 5B which form the gas passages between the separators 5A, 5B and the membrane electrode assembly M; and the displacement absorber 6 which is conductive and which is disposed on the one separator 5A side, the displacement absorbers 6 is connected to the one separator 5A to form each of the single fuel cells FC.

Thereafter, the single fuel cells FC and the displacement absorbers 6 are stacked in such a way that these parts are alternately arranged and, as shown in the specific configuration of the FIGS. 1 and 2, a predetermined load is applied in the stacked direction thereof to restrain the single fuel cells FC. This can achieve accurate and efficient assembly of the fuel cell stack FS in which the displacement absorbers 6 are interposed between the single fuel cells FC.

In the fuel cell stack FS described above, the cooling fluid flows through the cooling fluid passages F between the single fuel cells FC located adjacent to each other when stacked while the anode gas and the cathode gas are supplied to the membrane electrode assembly M, and the single fuel cells FC thereby generate electric energy through electrochemical reaction. Then, when the interiors of the single fuel cells FC thermally expand or the membrane electrode assemblies M swell, the displacement of the separators 5A, 5B is absorbed by the displacement absorbers 6. Moreover, the displacement absorbers 6 have, in addition to the above-mentioned function of absorbing displacement, a function as a connector electrically connecting the single fuel cells FC to each other.

In each of the single fuel cells FC, the displacement absorber 6 is connected to the one separator 5A, and the tight contact between the two parts reduces the electrical contact resistance. Moreover, in the embodiment, since the one separator 5A and the displacement absorber 6 are connected to each other by welding (welded portions W), the connection state is tighter and the contact resistance is further reduced.

Due to this, the single fuel cell FC can achieve drastic reduction in electrical contact resistance between the separators 5A, 5B and the displacement absorber 6 which are connection portions with the other single fuel cell FC located adjacent when stacked. Moreover, the single fuel cell FC can reduce the contact resistance of the entire fuel cell stack FS and contribute to improvement in the power generation performance.

In each of the single fuel cells FC, the base plate 6A of the displacement absorber 6 is connected (welded) to the protruding portions T in the cell-outer-side surface of the separator 5A having a shape with protrusions and recesses in cross section (wave-shaped cross section). Accordingly, the performance of the displacement absorber 6 is not impaired at all and, in addition, the connection can be easily and surely achieved.

Furthermore, in each of the single fuel cells FC, the spring function portions 6B of the displacement absorber 6 each have the cantilever structure in which the base plate 6A side is the fixed end K and the distal end side is the free end J. Accordingly, the function of sufficiently absorbing the displacement in the thickness direction can be secured with a simple structure and the manufacturing cost is low. Moreover, in the displacement absorber 6, the shape of the spring function portions 6B is simple. Accordingly, it is possible to form the spring function portions 6B at a small pitch and to reduce the spring stiffness thereof. When the spring stiffness is small, the spring characteristic is such that load variation with respect to the displacement is small. Since variation in surface pressure is small, the electrical contact resistances of components are stable even when there is displacement in the compressed direction during operation or permanent set due to aging deterioration.

In addition, in each of the single fuel cells FC, the displacement absorber 6 is connected to the separator 5A disposed on the anode side, by welding. Accordingly, corrosion resistance can be improved. Specifically, since modification occurs in the welded portions, welding is performed on portions selected in consideration of an environment (atmosphere) unique to the single fuel cell, i.e. the separator 5A on the anode side where the effect of the modification is small, and the corrosion resistance is thereby improved.

Furthermore, in each of the single fuel cells FC, the corrosion resistance can be improved by performing welding from the displacement absorber 6 side toward the separator 5A as shown in FIG. 4B. Specifically, the corrosion resistance is improved by causing the modification due to welding to occur mainly in the displacement absorber 6 and thereby reducing the modification in the separator 5A as much as possible.

Moreover, in each of the single fuel cells FC, the base plate 6A of the displacement absorber 6 has an outer edge portion 6C which does not overlap the reaction region of the membrane electrode assembly M and welding is performed on at least the outer edge portion 6C. Accordingly, the welding area of a portion corresponding to the reaction region is small and this contributes to improvements in power generation performance and durability.

The single fuel cell FC of the present invention includes, as another embodiment, the single fuel cell FC in which the fixed end K side of the selected spring function portion 6B in the displacement absorber 6 is connected to the one separator 5A. In this case, the fixed end K side of the spring function portion 6B refers to a portion on the base plate 6A which is on the fixed end K side of the spring function portion 6B, as shown by one of the welded portions W in FIG. 5. There is no worry of this connection impairing a spring function of the selected spring function portion 6B.

In the single fuel cell FC described above, the conductivity between the single fuel cells FC adjacent to each other is improved when the fuel cell stack FS is formed. Specifically, since the displacement absorber 6 also has the function of a connector as described above, the spring function portion 6B serves as an electrical communication path. In other words, the spring function portion 6B achieves electrical communication between the free end J side in contact with one single fuel cell FC and the fixed end K side connected to another single fuel cell FC.

In view of this, in the single fuel cell FC, the fixed end K side of the spring function portion 6B is connected to the one separator 5A to form, on the fixed end K side, a portion where the electrical contact resistance is smallest, and the shortest electrical communication path is thereby secured. This can further improve the conductivity between the single fuel cells FC adjacent to each other.

The single fuel cell FC of the present invention includes, as another embodiment, the single fuel cell FC in which the one separator is the separator 5B disposed on the cathode side of the electrode layers 2, 3. Specifically, although the displacement absorber 6 is connected to the separator 5A on the anode side in the aforementioned embodiment shown in FIGS. 4A and 4B, the displacement absorber 6 is connected to the separator 5B on the cathode side by welding in this embodiment. In this case, as in the aforementioned embodiment, it is effective to perform welding from the displacement absorber 6 side toward the separator 5B.

The single fuel cell FC described above is configured to prevent deterioration in corrosion resistance of the separator made of stainless steel due to thermal hysteresis in welding. FIG. 7 is a graph showing a relationship between the current density and the potential in presence of thermal hysteresis and the relationship in absence thereof. When the thermal hysteresis is present, the current density is high on the anode side which is maintained at 0 volt during operation. In view of this, in the single fuel cell FC described above, the displacement absorber 6 is connected to the separator 5B on the cathode side by welding, so that thermal hysteresis is avoided on the anode side and is left on the cathode side. The deterioration of the separator 5B due to corrosion is thereby suppressed.

In the aforementioned embodiment, welding is performed on the portions selected in consideration of the environment (atmosphere) unique to the single fuel cell, that is, the separator 5A on the anode side where the effect of the modification is small. On the other hand, in this embodiment, welding is performed on the separator 5B on the cathode side in view of the corrosion resistance of the separator made of stainless steel. Accordingly, it is preferable to appropriately select one from these two embodiments depending on the specific structure of the single fuel cell, differences in constituent materials, and the like.

In the embodiments described above, in the each of single fuel cells FC of the present invention, the separator 5A (5B) and the displacement absorber 6 are connected to each other by welding. However, as shown in FIG. 4C, the displacement absorber 6 may be connected to the protruding portions T of the separator 5A (5B) by at least one of brazing using a conductive brazing material R and adhesion using a conductive adhesive B. Soldering is included in brazing.

Since the separators 5A, 5B are made of stainless steel, a material having a melting point lower than stainless steel is selected as the conductive brazing material R and silver (Ag), gold (Au), palladium (Pd), copper (Cu), nickel (Ni) and the like can be given as an example. Moreover, a paste including at least one of silver, gold, palladium, copper, and nickel as a main component can be used as the conductive adhesive B.

In the single fuel cell FC described above, when the displacement absorber 6 is to be connected to the separator 5A (5B), joining can be performed at a temperature lower than that of welding. Hence, in the single fuel cell FC described above, it is possible to reduce risks of an adverse effect of thermal expansion of the constituent members, formation of cracks and holes due to deterioration in the material, and the like.

Second Embodiment

FIGS. 8A, 8B, and 9 are views for explaining another embodiment of the fuel cell stack of the present invention together with FIGS. 1 to 3. FIG. 8A is an enlarged cross-sectional view of a portion along the I-I line shown in FIG. 3. FIG. 8B is a cross-sectional view of a main portion which shows another example and shows a portion between single fuel cells FC located adjacent to each other when stacked. Therefore, separators 40, 41 shown on upper and lower sides in FIGS. 8A and 8B respectively form part of separate single fuel cells FC on the upper and lower sides.

Specifically, in each of the single fuel cells FC of the embodiment, the paired separators 40, 41 are disposed in such a way that gas passages for power generation gases to flow are defined and formed respectively on both surface sides of the cell frame 42 shown in FIG. 2. Each of the separators 40, 41 is formed by pressing a metal plate made of stainless steel or the like, and is formed to have substantially the same shape and size as the cell frame 42.

In the single fuel cell FC described above, a hydrogen-containing gas or an oxygen-containing gas flows from one side of the cell frame 42 to the other side thereof or from the other side to the one side. Specifically, the power generation gases flow in a Y direction in FIGS. 1 and 2.

The cell frame 42 and both of the separators 40, 41 which are described above are subjected to sealing in peripheral portions thereof to be joined together in a liquid-tight manner and thereby form the single fuel cell FC. Between the single fuel cells FC adjacent to each other in a stacked direction, a cooling fluid passage F (see FIG. 8A) for a cooling fluid to flow between the separators 40, 41 is formed by joining the separators 40, 41 facing each other in a liquid-tight manner.

Moreover, manifolds H of the cell frame 42 and the separators 40, 41 communicates with one another and a gas flow port and a cooling fluid flow port (not illustrated) extending in the stacked direction of the single fuel cells FC are thereby formed.

FIG. 9 is a partial perspective view of a displacement absorber forming part of the fuel cell stack. The displacement absorber 36 in the drawing is inserted in the cooling fluid passage F defined and formed between the single fuel cells FC adjacent to each other. The displacement absorber 36 is a member in which multiple elastic protrusions (spring function portions) 50 and flow-spread preventing protrusions 55 are arranged on one surface side of a base plate 51.

The elastic protrusions 50 extend in the flow direction Y of the cooling fluid flowing through the cooling fluid passage F described above and are arranged at predetermined intervals in the flow direction Y and a direction Z orthogonal to the flow direction Y.

The elastic protrusions 50 are formed integrally with the base plate 51 formed of a conductive metal plate. The elastic protrusions are inclined in the same direction in a plane parallel to the flow direction Y of the cooling fluid flowing through the cooling fluid passage F and are formed to be plate-shaped bodies of the same shape and size.

The elastic protrusions 50 are formed integrally by being cut out and bent upward from the base plate 51 in such a way that the elastic protrusions 50 have a vertical rectangle shape in a view in the flow direction Y and have a gentle S-shape in a view in the direction Z orthogonal to the flow direction Y.

The flow-spread preventing protrusions 55 are provided to prevent the cooling fluid from flowing out to portions other than an active area (power generation region) which is a region in a membrane electrode assembly M, and are arranged in the flow direction Y of the cooling fluid at predetermined intervals, on both sides of the cooling fluid passage F described above.

The flow-spread preventing protrusions 55 are formed integrally with the base plate 51 described above. The flow-spread preventing protrusions 55 are inclined in the same direction in a plane parallel to the flow direction Y of the cooling fluid and are formed to be plate-shaped bodies of the same shape and size.

Specifically, the flow-spread preventing protrusions 55 are each formed as follows. An upper peripheral edge 55a is cut out and bent upward to extend toward an upstream side in the flow direction Y while a lower peripheral edge 55b is cut out and bent downward to extend toward a downstream side in the flow direction Y. Moreover, a center peripheral edge 55c of the flow-spread preventing protrusion 55 is formed to be integral with a rib 51a of the base plate 51.

In other words, each of the flow-spread preventing protrusions 55 has a horizontal rectangle shape in the view in the flow direction Y, and is set in an inclined posture in which a predetermined angle of attack is formed relative to the flow direction Y in the view in the direction Z orthogonal to the flow direction Y. In a portion of the base plate 51 on an outer side of the flow-spread preventing protrusions 55, a held piece 51b which is parallel to the flow direction Y and which has a constant width is formed integrally. In the displacement absorber 36, the held piece 51b of the base plate 51 corresponds to an end portion 36T.

In each of the flow-spread preventing protrusions 55 described above, the upper peripheral edge 55a and the lower peripheral edge 55b are bent upward and downward to come in contact with the separators 40, 41 on the upper and lower side. Accordingly, the flow-spread preventing protrusion 55 has a spring function of absorbing displacement as similar to the elastic protrusions 50 of the displacement absorber 36, in addition to the function of preventing the cooling fluid from flowing out to portions other than the active area (power generation region).

As described above, the fuel cell stack of the embodiment is formed by stacking the multiple single fuel cells FC and has the following structure. The cooling fluid passage F in which the displacement absorber 36 exists is formed between the single fuel cells FC located adjacent to each other when stacked. Moreover, at least part of the end portion 36T (held piece 51b) of the displacement absorber 36 is held between and connected to the separators 40, 41 of the respective single fuel cells FC adjacent to each other.

In the embodiment, as shown in FIG. 8A, the held piece 51b are held between and joined to both of side portions 40a, 41a of the separators 40, 41. In the embodiment, the separators 40, 41 and the held piece 51b of the displacement absorber 36 are joined together along the entire periphery in a liquid tight manner. Moreover, as shown in FIG. 8B, the two separators 40, 41 and the held piece 51b of the displacement absorber 36 can be commonly joined together by welding (welded portion W).

The displacement absorber 36 described above is disposed in the cooling fluid passage F with the base plate 51 coming in contact with the separator 40 and the upper peripheral edges 50a of the elastic protrusions 50 and the upper peripheral edges 55a of the flow-spread preventing protrusions 55 coming in contact with the separator 41.

For example, the elastic protrusions 50 and the flow-spread preventing protrusions 55 which are described above can be formed to have finer structures by bending portions trimmed through cutting processes such as punching and processes involving removable of materials such as edging.

In the fuel cell stack FS of the embodiment described above, since the separators 40, 41 and the displacement absorber 36 are in tight contact with one another, the electrical contact resistance between the separators 40, 41 and the displacement absorber 36 which are connection portions of the single fuel cells FC adjacent to each other can be drastically reduced as in the aforementioned embodiment. In addition, the following effects can be obtained.

Since at least part of the end portion 36T of the displacement absorber 36 disposed in the cooling fluid passage F is held between and connected to the separators 40, 41, the reliability and durability of the displacement absorber 36 can be improved. Specifically, the cooling fluid causes a load or a moment to be locally concentrated in a connection portion between the base plate 51 and each of the flow-spread preventing protrusions 55 in some cases, but since the held piece 51b on the outer side of the flow-spread preventing protrusions 55 is held between and joined to both of the side portions 40a, 41a of the separators 40, 41, a locally-generated load or a moment of the displacement absorber 36 is distributed and the durability and the reliability are improved.

Even when a member forming the single fuel cell FC or the fuel cell stack FS is displaced, the displacement absorber 36 can be maintained at a fixed position because at least part of the end portion 36T (held piece 51b) of the displacement absorber 36 is held between and connected to the separators 40, 41.

Commonly welding the end portion 36T (held piece 51b) of the displacement absorber 36 and the two separators 40, 41 holding the end portion 36T makes these parts come in tight contact with one another. This can secure a better electrical path and at the same time further reduce the electrical contact resistance. In addition, the separators 40, 41 and the displacement absorber 36 can be simultaneously connected together and the invention can be carried out in a simple and inexpensive manner. Moreover, the cooling fluid can be encapsulated by joining the separator 40, 41 and the end portion 36T of the displacement absorber 36 along the entire periphery in a liquid tight manner.

Forming the flow-spread preventing protrusions 55 integrally with the base plate 51 by cutting out and bending the flow-spread preventing protrusions 55 upward from the base plate 51 allows the flow-spread preventing protrusions 55 to be manufactured in a simple way which requires no steps of, for example, separately forming the protruding portions and then joining them. Moreover, since no joining portions and the like exist, it is easier to secure the strength of the peripheral edge portions where the flow-spread preventing protrusions 55 come in contact with the base plate 51 and the reliability can be improved compared to the case where the flow-spread preventing protrusions 55 are formed by joining.

Third Embodiment

Next, a displacement absorber of another example is described with reference to FIGS. 10A, 10B, and 11. FIG. 10A is an enlarged cross-sectional view of a portion corresponding to the I-I line shown in FIG. 3, and FIG. 10B is a cross-sectional view of a main portion which shows another embodiment. FIG. 11 is a perspective view of part of the displacement absorber shown of the other example. Parts equivalent to those described in the aforementioned embodiments are denoted by the same reference numerals and description thereof is omitted.

In a displacement absorber 46 shown in FIG. 10A, only the elastic protrusions (spring function portions) 50 are formed integrally with the base plate 51 made of the conductive metal plate described above. In other words, the aforementioned flow-spread preventing protrusions are not provided. In this case also, holding at least part of an end portion 46T of the displacement absorber 46 disposed in a cooling fluid passage F between separators 40, 41 and connecting it to the separators 40, 41 improves the reliability and the durability of the displacement absorber 46 as in the aforementioned embodiment.

In the embodiment, the displacement absorber configured such that at least part of the end portion 46T (held piece 51b) of the displacement absorber 46 is held between the separators 40, 41 is given as an example. However, the displacement absorber may be configured as follows.

Specifically, as shown in FIG. 10B, the end portion 46T of the displacement absorber 46 and the separators 40, 41 can be brazed together by using a conductive brazing material R. Employing brazing using the conductive brazing material R makes it possible to obtain effects of reducing the electrical contact resistance and maintaining the displacement absorber 46 at the fixed position as in the aforementioned embodiments. In addition, it is possible to perform joining at a temperature lower than that of welding when the displacement absorber 46 is connected to the separators 40, 41 and to thereby reduce risks of an adverse effect of thermal expansion of the constituent members, formation of cracks and holes due to deterioration in the material, and the like.

Fourth Embodiment

FIG. 12A is an explanatory view schematically showing separators 40, 41 and an end portion 46T (held piece 51b) of a displacement absorber 46 and FIG. 12B is a cross-sectional view showing another embodiment. Parts equivalent to those described in the aforementioned embodiments are denoted by the same reference numerals and description thereof is omitted.

The separators 40, 41 and the displacement absorber 46 which are shown in FIG. 12A are configured such that both end portions 46T (held pieces 51b) of a base plate 51 of the displacement absorber 46 extend outward beyond both of side portions 40a, 41a of the separators 40, 41. Due to this, the following effect is obtained in addition to the effects obtained in the aforementioned embodiments. The positioning of the displacement absorber 46 relative to the separators 40, 41 can be facilitated when the displacement absorber 46 is disposed in a cooling fluid passage F.

In the embodiment, the displacement absorber configured such that at least part of the end portions 46T (held pieces 51b) of the displacement absorber 46 is held between the separators 40, 41 is given as an example. However, the displacement absorber may be configured as follows.

Specifically, as shown in FIG. 12B, the end portion 46T of the displacement absorber 46 and the separators 40, 41 can be adhered together by using a conductive adhesive B. Employing adhesion using the conductive adhesive B makes it possible to obtain effects of reducing the electrical contact resistance and maintaining the displacement absorber 46 at the fixed position as in the aforementioned embodiment. In addition, it is possible to perform joining at a temperature lower than that of welding when the displacement absorbers 46 is connected to the separators 40, 41 and to thereby reduce risks of an adverse effect of thermal expansion of the constituent members, formation of cracks and holes due to deterioration in the material, and the like.

Fifth Embodiment

A fuel cell stack FS shown in FIG. 13 has the same basic configuration as that of the embodiment shown in FIGS. 8A, 8B, and 9. Accordingly, constituent parts which are the same as those of the aforementioned embodiments are denoted by the same reference numerals and detailed description there of is omitted.

The fuel cell stack FS of the present invention can be configured such that a displacement absorber 36 and at least one of separators 40, 41 of respective single fuel cells FC adjacent to each other are joined together in at least part of contact portions thereof. In the drawing, the separator 41 on the upper side is a separator of one single fuel cell FC out of the single fuel cells located adjacent to each other when stacked and the separator 40 on the lower side is a separator of the other single fuel cell FC.

Specifically, in the fuel cell stack FS of the drawing, as in the embodiment shown in FIG. 8B, the two separators 40, 41 and a held piece 51b of the displacement absorber 36 are commonly joined together by welding (welded portion W). In addition, the one separator 41 and upper peripheral edges 55a of flow-spread preventing protrusions 55 in the displacement absorber 36 can be joined by welding (welded portion W) while the other separator 40 and lower peripheral edges 55b of the flow-spread preventing protrusions 55 in the displacement absorber 36 can be joined by welding (welded portion W).

Here, the displacement absorber 36 in the drawing has the held piece 51b (end portion 36T) formed on the same plane as a base plate 51 on an outer side of the base plate 51. Accordingly, the configuration in which the flat held piece 51b and both of the side portions 40a, 41a of the two separators 40, 41 holding the held piece 51b are joined together make it possible to perform the joining work easily and surely.

The joining of the separators 40, 41 and the displacement absorber 36 can be performed by brazing using a conductive brazing material (R) or by adhesion using a conductive adhesive (B), instead of welding (welded portions W), and operations and effects similar to those of the aforementioned embodiments can be obtained.

Sixth Embodiment

As in the embodiment shown in FIGS. 12A and 12B, separators 40, 41 and a displacement absorber 46 which are shown in FIGS. 14A to 14C are configured such that both end portions 46T (held pieces 51b) of a base plate 51 of the displacement absorber 46 extend outward beyond both of side portions 40a, 41 a of the separators 40, 41.

A fuel cell stack FS of the present invention can be configured such that the displacement absorber 46 and at least one of the separators 40, 41 of respective single fuel cells FC adjacent to each other are joined together in at least part of contact portions thereof. Specifically, as shown in FIG. 14A, the one separator 40 and the end portion 46T (held piece 51b) of the displacement absorber 46 can be joined to each other and, as shown in FIG. 14B, the other separator 41 and the end portion 46T (held piece 51b) of the displacement absorber 46 can be joined to each other.

Moreover, as shown in FIG. 14C, both of the separators 40, 41 and the end portion 46T (held piece 51b) of the displacement absorber 46 can be joined together. Welding, (welded portion W), brazing using a conductive brazing material (R), and adhesion using a conductive adhesive (B) can be selectively used to perform the joining.

In the fuel cell stack FS of the embodiment, the same operations and effects as those of the aforementioned embodiments can be obtained and, in addition, the separator to be joined to the displacement absorber and the method of joining can be freely selected depending on the assembly steps of the fuel cell stack.

The fuel cell stacks FS particularly shown in FIGS. 8A to 14B can be manufactured in the following method. Specifically, upon manufacturing the fuel cell stack FS formed by stacking the multiple single fuel cells FC each including: the membrane electrode assembly M; the paired separators 40, 41 which form the gas passages between the separators 40, 41 and the membrane electrode assembly M; and the displacement absorber 36 (46) which is conductive and which is disposed on the one separator side, first, the displacement absorber 36 (46) and at least one of the separators 40, 41 of the respective single fuel cells FC adjacent to each other are joined together in at least part of contact portions thereof.

Thereafter, the single fuel cells FC and the displacement absorbers 36 are stacked in such a way that these parts are alternately arranged and, as shown in the specific configuration of the FIGS. 1 and 2, a predetermined load is applied in the stacked direction thereof to restrain the single fuel cells FC. At this time, at least part of the end portion 36T (46T) of the displacement absorber 36 (46) can be, held between and connected to the separators 40, 41 of the respective single fuel cells FC adjacent to each other.

This can achieve accurate and efficient assembly of the fuel cell stack FS in which the displacement absorbers 36 (46) are interposed between the single fuel cells FC.

Note that the configurations of the single fuel cell and the fuel cell stack of the present invention are not limited to those of the aforementioned embodiments. Details of the configurations can be changed as appropriate within the scope not departing from the spirit of the present invention. For example, the following modified embodiments can be carried out.

In the aforementioned embodiments, description is given of the examples in which the entire periphery of the end portion 36T, 46T (held piece 51b) of the displacement absorber 36, 46 disposed in the cooling fluid passage F is held. However, only part of the end portion 36T, 46T may be held. Moreover, description is given of the examples in which at least part of the end portion 36T, 46T (held piece 51b) of the displacement absorber 36, 46 disposed in the cooling fluid passage F is held between the separators 40, 41. However, part of a portion other than the end portion 36T, 46T (held piece 51b) of the displacement absorber 36, 46 may be held. For example, a portion of the base plate 51 between the elastic protrusions (spring function portions) 50 adjacent to each other may be held. Furthermore, in the aforementioned embodiments, the connection of the displacement absorber is achieved by welding and holding. However, the invention is not limited to this and any structure capable of transmitting a load in the stacked direction can be employed.

The entire contents of Japanese Patent Application No. 2012-058162 (filed on Mar. 15, 2012), Japanese Patent Application No. 2012-076906 (filed on Mar. 29, 2012), and Japanese Patent Application No. 2012-267164 (filed on Dec. 6, 2012) are herein incorporated by reference.

Although the present invention has been described above by reference to the embodiments and the example, the present invention is not limited to those, and it will be apparent to these skilled in the art that various modifications and improvements can be made.

REFERENCE SIGNS LIST 1 electrolyte membrane
2 anode layer (electrode layer)
3 cathode layer
4A gas passage on anode side
4B gas passage on cathode side
5A separator on anode side
5B separator on cathode side
6 displacement absorber
6A base plate
6B spring function portion
6C outer edge portion
36 displacement absorber
36T end portion of displacement absorber
40 separator
41 separator
46 displacement absorber 46T end portion of displacement absorber
50 elastic protrusion (spring function portion)
51b held piece (end portion of displacement absorber)
B conductive adhesive
F cooling fluid passage
FC single fuel cell
FS fuel cell stack
J free end
K fixed end
M membrane electrode assembly
O recessed portion
R conductive brazing material
T protruding portion
W welded portion

The invention claimed is:

1. A fuel cell stack formed by laminated single fuel cells, a single fuel cell comprising:
a membrane electrode assembly having a structure including paired electrode layers and an electrolyte membrane held between the paired electrode layers;
paired separators each forming a gas passage between a separator and the membrane electrode assembly, and
a displacement absorber having a conductive property,
wherein the laminated single fuel cells form a cooling fluid passage between one separator of the single fuel cell and an adjacent-side separator of another single fuel cell, wherein the displacement absorber is arranged in the cooling fluid passage and has a base plate and multiple spring function portions arranged on one surface of the base plate, and the base plate of the displacement absorber is fixed to any one of the separators, wherein each of the spring function portions of the displacement absorber has a fixed end on a side of the base plate, and a free end on a side of a distal end of the spring function portion, and
wherein the fixed end of a spring function portion selected from the multiple spring function portions is fixed to the one separator.

2. The fuel cell stack according to claim 1,
wherein the one separator has a concavo-convex shape in cross section, and
wherein the displacement absorber is fixed to protruding portions in a cell-outer-side surface of the one separator.

3. The fuel cell stack according to claim 1, wherein the base plate of the displacement absorber has an outer edge portion connected to the one separator and non-overlapping a reaction region of the membrane electrode assembly.

4. The fuel cell stack according to claim 1, wherein the one separator and the displacement absorber are in welded connection to each other.

5. The fuel cell stack according to claim 1, wherein the one separator and the displacement absorber are in connection to each other by at least one of brazing using a conductive brazing material or adhesion using a conductive adhesive.

6. The fuel cell stack according to claim 4, wherein the one separator is a separator disposed on an anode side of the paired electrode layers.

7. The fuel cell stack according to claim 4, wherein the one separator is a separator disposed on a cathode side of the paired electrode layers.

8. The fuel cell stack according to claim 6, wherein a direction of the welded connection is from the displacement absorber toward the one separator.

9. The fuel cell stack according to claim 1, wherein the displacement absorber and at least one of the separators of the respective two of the single fuel cells stacked adjacent to each other are joined together in at least part of contact portions of the displacement absorber and the at least one of the separators.

10. The fuel cell stack according to claim 1, wherein at least part of an end portion of the displacement absorber is held between and fixed to the separators of the respective two of the single fuel cells stacked adjacent to each other.

11. The fuel cell stack according to claim 10, wherein the separators and the end portion of the displacement absorber are joined together.

12. The fuel cell stack according to claim 10, wherein the end portion of the displacement absorber extends outward beyond the separators.

13. The fuel cell stack according to claim 11, wherein the separators and the end portion of the displacement absorber are joined together in a liquid tight manner along an entire periphery.

14. The fuel cell stack according to claim 13, wherein the displacement absorber and end portions of the two separators holding the displacement absorber are joined together in a same welding.

15. The fuel cell stack according to 1, wherein the separators and the displacement absorber are joined together by at least one of welding, brazing using a conductive brazing material, or adhesion using a conductive adhesive.

* * * * *